United States Patent
Sato et al.

(10) Patent No.: US 12,095,076 B2
(45) Date of Patent: Sep. 17, 2024

(54) NEGATIVE ELECTRODE ACTIVE MATERIAL FOR SECONDARY BATTERIES, AND SECONDARY BATTERY

(71) Applicant: Panasonic Intellectual Property Management Co., Ltd., Osaka (JP)

(72) Inventors: Yosuke Sato, Osaka (JP); Yohei Uchiyama, Hyogo (JP); Taisuke Asano, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 577 days.

(21) Appl. No.: 17/311,818

(22) PCT Filed: Dec. 4, 2019

(86) PCT No.: PCT/JP2019/047480
§ 371 (c)(1),
(2) Date: Jun. 8, 2021

(87) PCT Pub. No.: WO2020/129652
PCT Pub. Date: Jun. 25, 2020

(65) Prior Publication Data
US 2022/0029151 A1    Jan. 27, 2022

(30) Foreign Application Priority Data
Dec. 21, 2018    (JP) .................... 2018-239311

(51) Int. Cl.
H01M 4/36    (2006.01)
H01M 4/38    (2006.01)
(Continued)

(52) U.S. Cl.
CPC ............. H01M 4/362 (2013.01); H01M 4/38 (2013.01); H01M 4/5825 (2013.01); *H01M 2004/027* (2013.01)

(58) Field of Classification Search
CPC .......................... H01M 4/362; H01M 4/582
(Continued)

(56) References Cited

U.S. PATENT DOCUMENTS

2016/0372753 A1    12/2016    Fukasawa et al.
2017/0214041 A1     7/2017    Minami et al.
(Continued)

FOREIGN PATENT DOCUMENTS

| CN | 103400971 A | * 11/2013 | ............. Y02E 60/10 |
| CN | 106575751 A | 4/2017 | |

(Continued)

OTHER PUBLICATIONS

English Translation of International Search Report dated Feb. 25, 2020, issued in counterpart Application No. PCT/JP2019/047480. (3 pages).

(Continued)

*Primary Examiner* — James M Erwin
*Assistant Examiner* — John S Medley
(74) *Attorney, Agent, or Firm* — WHDA, LLP

(57) ABSTRACT

A negative electrode active material for a secondary battery includes a silicate composite particle. The silicate composite particle contains silicate phases, silicon particles dispersed in the silicate phases, and a carbon phase. The silicate phases contain at least one selected from the group consisting of an alkali metal and an alkaline earth metal. At least parts of the carbon phase coat at least parts of surfaces of the silicon particles.

7 Claims, 3 Drawing Sheets

(51) Int. Cl.
  *H01M 4/58*  (2010.01)
  *H01M 4/02*  (2006.01)
(58) Field of Classification Search
  USPC .......................................................... 429/231
  See application file for complete search history.

(56) References Cited

U.S. PATENT DOCUMENTS

| | | | |
|---|---|---|---|
| 2017/0309950 A1* | 10/2017 | Minami | H01M 4/405 |
| 2017/0331108 A1 | 11/2017 | Minami et al. | |
| 2018/0069233 A1 | 3/2018 | Matus et al. | |
| 2018/0287148 A1* | 10/2018 | Akira | H01M 4/36 |
| 2018/0342757 A1* | 11/2018 | Choi | H01M 4/386 |
| 2019/0006656 A1* | 1/2019 | Matsuno | H01M 10/0525 |
| 2021/0111395 A1* | 4/2021 | Shin | H01M 4/483 |

FOREIGN PATENT DOCUMENTS

| | | | | |
|---|---|---|---|---|
| JP | 2007-059213 A | 3/2007 | | |
| JP | 2013-161705 A | 8/2013 | | |
| WO | 2015/145521 A1 | 10/2015 | | |
| WO | 2016/035290 A1 | 3/2016 | | |
| WO | 2016/121321 A1 | 8/2016 | | |
| WO | WO-2017119032 A1 * | 7/2017 | ............. | C01B 32/05 |
| WO | 2018/042361 A1 | 3/2018 | | |

OTHER PUBLICATIONS

English Translation of Chinese Search Report dated Feb. 11, 2023 for the related Chinese Patent Application No. 201980083875.3.

\* cited by examiner

NEGATIVE ELECTRODE ACTIVE MATERIAL FOR SECONDARY BATTERIES, AND SECONDARY BATTERY

TECHNICAL FIELD

The present invention primarily relates to an improvement of a negative electrode active material for a secondary battery.

BACKGROUND ART

In recent years, since having a high voltage and a high energy density, a secondary battery, such as a nonaqueous electrolyte secondary battery, has been expected to be used as a power source for a small-sized consumer use, an electric power storage device, and an electric car. While an increase in energy density of a battery has been pursued, as a negative electrode active material having a high theoretical capacity density, the use of a material containing silicon (Si) which forms an alloy with lithium has been expected.

PTL 1 has proposed a nonaqueous electrolyte secondary battery in which as a negative electrode active material, a composite material containing a lithium silicate phase represented by $Li_{2z}SiO_{2+z}$ (0<z<2) and silicon particles dispersed in the lithium silicate phase is used.

CITATION LIST

Patent Literature

PTL 1: International Publication Pamphlet No. WO2016/035290

SUMMARY OF INVENTION

Technical Problem

Composite particles of lithium silicate phases and silicon particles are manufactured by sintering a mixture of a glassy lithium silicate powder and silicon particles in a high-temperature and high-pressure atmosphere. Since an amount of the silicon particles contained in the composite particles can be arbitrarily controlled by a mixing rate between the lithium silicate powder and the silicon particles, composite particles having a high capacity can be obtained. However, during the sintering, the silicon may be oxidized by a reaction between the silicate and the silicon, and as a result, expected capacity and charge/discharge efficiency may not be obtained in some cases.

Solution to Problem

In consideration of the problem described above, one aspect of the present invention relates to a negative electrode active material for a secondary battery, comprising a silicate composite particle. The silicate composite particle contains silicate phases, silicon particles dispersed in the silicate phases, and a carbon phase. In the negative electrode active material described above, the silicate phases contain at least one selected from the group consisting of an alkali metal and an alkaline earth metal, and at least parts of the carbon phase coat at least parts of surfaces of the silicon particles.

Advantageous Effects of Invention

According to the present disclosure, the oxidation of the silicon in a sintering step is suppressed, and hence, the capacity and the charge/discharge efficiency are improved.

Although novel features of the present invention will be described in the accompanying claims, both the configuration and the content of the present invention will be further deeply understood together with other objects and features of the present invention by the following detailed description with reference to drawings.

DESCRIPTION OF EMBODIMENTS

Figure 1:
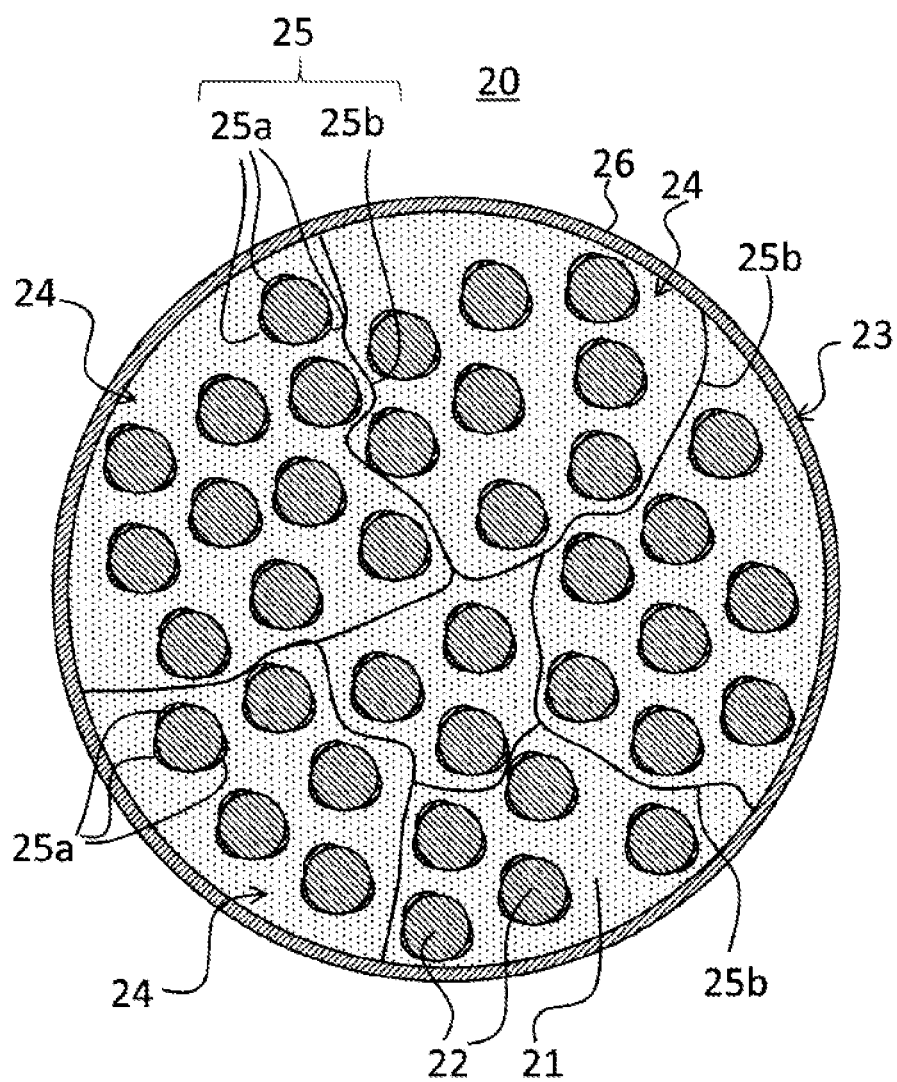
FIG. 1 is a cross-sectional view schematically showing a silicate composite particle according to an embodiment of the present disclosure.

A negative electrode active material for a secondary battery according to an embodiment of the present disclosure includes silicate composite particles each of which contain silicate phases, silicon particles dispersed in the silicate phases, and a carbon phase. In other words, the silicate composite particles each have silicate phases which are sea portions of sea-island structures and silicon particles which are island portions thereof. When an amount of the silicon particles dispersed in the silicate phase is controlled, an increase in capacity can be performed. Since the silicon particles are dispersed in the silicate phase, expansion and contraction of the silicate composite particle in charge/discharge can be suppressed. By using the silicate composite particles, an increase in capacity and an improvement in cycle characteristics of the battery can be achieved.

In this embodiment, at least parts of the carbon phase coat at least parts of surfaces of the silicon particles. Since the at least parts of the surfaces of the silicon particles are coated with the carbon phase, oxidation of the silicon in a sintering step to obtain the silicate composite particles can be suppressed. Hence, when the silicate composite particles are used, the capacity and the charge/discharge efficiency are improved.

The carbon phase may include first regions which cover at least parts of the surfaces of the silicon particles and second regions present along at least parts of interfaces of primary particles adjacent to each other. The second region suppresses a decrease in ion conductivity of the silicate composite particle and also contributes to a decrease in stress generated in the silicate phase in association with expansion and contraction of the silicon particles in charge/discharge.

An area rate R1 of the carbon phase occupied in the cross-section of the silicate composite particle may be, for example, 0.5% to 10%, may also be 2% to 6%, and may further be 3% to 5%. In particular, when R1 is set to 3% or more, an effect to suppress the oxidation of the silicon caused by a reaction between the silicon and the silicate becomes significant. In addition, when R1 is set to 5% or less, an abundance ratio of the silicon particles occupied in the silicate composite particle can be increased, and in particular, a higher capacity is likely to be obtained.

R1 is obtained, for example, by the following method. First, a cross-sectional image of the silicate composite particles is photographed. For example, after a battery is disassembled, and a negative electrode is recovered, a cross-section of a negative electrode active material layer is obtained by a cross-section polisher (CP), so that the cross-sectional image of the silicate composite particles is obtained. After the cross-section of the silicate composite particle is observed using a scanning electron microscope (SEM), and 10 silicate composite particles having a maximum diameter of 5 μm or more are randomly selected from a reflected electron image, a mapping analysis of carbon is performed on each particle by an energy dispersive X-ray method (EDX). By the use of image analysis software, a carbon-containing area of the image is calculated. An observation magnification is preferably 2,000 to 20,000 times. Rates of measurement values of the carbon-containing areas of the 10 particles thus selected with respect to the area of the measurement range are averaged, so that R1 is obtained.

In addition, in charge/discharge processes, for example, by decomposition of an electrolyte, a coating film may be formed on the surface of the silicate composite particle. In addition, on the surface of the silicate composite particle, an electrically conductive layer may be provided in some cases. Hence, the mapping by an EDX is performed inside a region apart from an outermost circumference of the cross-section of the silicate composite particle by 1 μm or more so that the coating film and the electrically conductive layer are not included in the measurement region. The rate of the carbon-containing area with respect to the area of the measurement region corresponds to R1.

By the mapping analysis using an EDX, a distribution state of the carbon phase inside the silicate composite particle may also be confirmed. An area rate of the first regions occupied in the cross-section of the silicate composite particle may be 0.5% to 10%, may also be 1% to 8%, may further be 2% to 6%, or may even further be 3% to 5%. Although the second regions are not always necessary, an area rate of the second regions occupied in the cross-section of the silicate composite particle may be, for example, 6% or less, may also be 0.05% to 6%, or may further be 1% to 3%. In addition, the area rate of the first regions is preferably set to be larger than the area rate of the second regions.

Hereinafter, preferable measurement conditions of a cross-sectional SEM-EDX analysis will be shown.

<SEM-EDX Measurement Conditions>

Machining device: SM-09010 (Cross Section Polisher), manufactured by JEOL Ltd.)

Machining condition: Accelerating voltage: 6 kV

Current: 140 μA

Vacuum degree: $1 \times 10^{-3}$ to $2 \times 10^{-3}$ Pa Measurement apparatus: electron microscope SU-70, manufactured by Hitachi, Ltd.)

Accelerating voltage for analysis: 10 kV
Field: free mode
Probe current mode: Medium
Probe current range: High
Anode Ap.: 3
OBJ Ap.: 2
Analysis area: 1 μm square
Analysis software: EDAX Genesis
CPS: 20,500
Lsec: 50
Time constant: 3.2

Although the surface of the silicon particle may be entirely coated with the carbon phase, the surface of the silicon particle may also be partially coated with the carbon phase. In the cross-section of the silicate composite particle, a rate R2 of the surface of the silicon particle coated with the carbon phase may be, for example, 30% to 100% and may also be 50% to 70%. Since R2 is set to 50% or more, the effect to suppress the oxidation of the silicon by a reaction between the silicon and the silicate becomes particularly significant. In addition, when R2 is set to 70% or less, a reaction resistance of the silicate composite particle can be decreased, and in addition, the abundance ratio of the silicon particles occupied in the silicate composite particle is likely to be increased.

R2 can be obtained from an equation of $R2=100 \times L1/(L1+L2)$ in which L1 represents a length along the outline of the cross-section of the silicon particle which is coated with the carbon phase, and L2 represents a length along the outline thereof which is not coated with the carbon phase. As is the case in which R1 is obtained, R2 may be obtained such that after 10 silicate composite particles having a maximum diameter of 5 μm or more are arbitrarily selected, the same measurement as described above is performed on arbitrary 10 silicon particles observed in the cross-section of each silicate composite particle, and R2 is calculated as an average value of $10 \times 10 = 100$ particles.

The silicate phase is an oxide phase containing Si, O, and at least one selected from the group consisting of an alkali metal and an alkaline earth metal. An atomic ratio O/Si of O to Si in the silicate phase is, for example, more than 2 and less than 3. The case in which O/Si is more than 2 and less than 3 is advantageous in terms of stability and lithium ion conductivity.

The alkali metal may be, for example, lithium (Li), potassium (K), or sodium (Na). Among those mentioned above, since an irreversible capacity is small, and an initial charge/discharge efficiency is high, the alkali metal preferably includes lithium. For example, 80 percent by mole or more of the alkali metal may be lithium. That is, the silicate composite particle may be a composite particle (hereinafter, may also be referred to as "LSX" in some cases) which contains lithium silicate phases and silicon particles dispersed in the lithium silicate phases.

The alkaline earth metal may be, for example, calcium (Ca), strontium (Sr), barium (Ba), or radium (Ra). The alkaline earth metal has a function to suppress elution of an alkali metal from a silicate phase which shows an alkalinity. Hence, when a slurry is prepared using the silicate composite particles as a negative electrode active material, a slurry viscosity is likely to be stabilized. In addition, Ca is preferable since a Vickers hardness of the silicate phase is improved, and the cycle characteristics can be further improved. A content of the alkaline earth metal with respect to the total mass of all the elements contained in the silicate phase other than O is, for example 20 percent by mole or less, may be 15 percent by mole or less, or may also be 10 percent by mole or less.

The silicate phase may further contain an element M. In this case, M may be at least one selected from the group consisting of Be, Mg, Al, B, Zr, Nb, Ta, La, V, Y, Ti, P, Bi Zn, Sn, Pb, Sb, Co, Er, F and W. Among those elements mentioned above, B is advantageous since the melting point is low, and the fluidity of the silicate in a molten state is improved. In addition, Al, Zr, Nb, Ta, and La are able to improve the Vickers hardness while maintaining the ion conductivity of the silicate phase. A content of the element M with respect to the total mass of all the elements contained in the silicate phase other than O is, for example, 10 percent by mole or less and may be 5 percent by mole or less.

A content of each of B, Na, K, and Al contained in the silicate phase can be quantitatively analyzed in accordance with JIS R3105 (1995) (methods for chemical analysis of borosilicate glasses). A content of Ca can be quantitatively analyzed in accordance with JIS R3101 (1995) (methods for chemical analysis of Soda-lime glasses).

The other elements each can be analyzed such that after a sample of the silicate phase or a sample of the silicate composite particle containing the silicate phases is totally dissolved in a heated acid solution (mixed acid of hydrofluoric acid, nitric acid, and sulfuric acid), carbon which is a solution residue is removed by filtration, and a filtrate thus obtained is analyzed. For example, after the filtrate is analyzed by an inductively coupled plasma atomic emission spectroscopy (ICP-AES), a spectrum intensity of each element may be measured. Subsequently, a calibration curve is formed using a commercially available reference solution of each element, and the content of the element contained in the silicate phase is calculated.

A quantitative analysis of each element in the silicate composite particle in a discharged state may also be performed, for example, by a SEM-EDX analysis, an Auger electron spectroscopic (AES) analysis, a laser abrasion ICP mass (LA-ICF-MS) analysis, or an X-ray photoelectron spectroscopic (XPS) analysis.

Although being present in the silicate composite particle, the silicate phases and the silicon particles can be separately quantitatively analyzed by using a Si-NMR. The Si content obtained by an ICP-AES as described above is the total of a Si amount forming the silicon particles and a Si amount in the silicate phases. On the other hand, the Si amount forming the silicon particles can be separately quantitatively analyzed by a Si-NMR. Hence, by subtracting the Si amount forming the silicon particles from the Si content obtained by an ICP-AES, the Si amount in the silicate phases can be quantitatively analyzed. In addition, as a reference substance necessary for the quantitative analysis, a mixture of a silicate phase containing a known Si amount and silicon particles at a predetermined rate may be used.

Hereinafter, preferable Si-NMR measurement conditions will be shown.

<Si-NMR Measurement Conditions>

Measurement apparatus: solid-state nuclear magnetic resonance spectroscopic measurement apparatus (INOVA-400), manufactured by Varian Probe: Varian 7 mm, CPMAS-2

MAS: 4.2 kHz

MAS speed: 4 kHz

Pulse: DD (45° pulse+signal acquisition time 1 H decoupling)

Repetition time: 1,200 to 3,000 sec

Observation width: 100 kHz

Observation center: approximately −100 ppm

Signal acquisition time: 0.05 sec

Cumulative number: 560

Sample amount: 207.6 mg

In order to increase the capacity and to improve the cycle characteristics, a content of the silicon particles the silicate composite particle may be, for example, 30 percent by mass or more and 30 percent by mass or less. Since the content of the silicon particles is set to 30 percent by mass or more, a rate of the silicate phases is decreased, and hence, the initial charge/discharge efficiency is likely to be improved. Since the content of the silicon particles is set to 80 percent by mass or less the degree of expansion and contraction of the silicate composite particle in charge/discharge is likely to be decreased.

The silicon particles dispersed in the silicate phase have particulate phases of single silicon (Si) and are each formed of a single crystallite or a plurality of crystallites, h crystallite size of the silicon particle is preferably 30 nm or less.

When the crystallite size of the silicon particle is 30 nm or less, the amount of change in volume of the silicon particle caused by expansion and contraction thereof in association with charge/discharge can be decreased, and the cycle characteristics can be further improved. For example, the silicon particle can be suppressed from being isolated which is caused by a decrease in number of contact points thereof with its periphery because of voids formed around the silicon particle during the contraction thereof, and hence, a decrease in charge/discharge efficiency caused by the isolation of the silicon particle can be suppressed. Although not particularly limited, a lower limit of the crystallite size of the silicon particle is, for example, 5 nm.

The crystallite size of the silicon particle is more preferably 10 nm or more and 30 nm or less and further preferably 15 nm or more and 25 nm or less. When the crystallite size of the silicon particle is 10 nm or more, since the surface area of the silicon particle can be decreased small, degradation of the silicon particle which generates an irreversible capacity is not likely to occur. The crystallite size of the silicon particle can be calculated from a half width of a diffraction peak which belongs to the (111) plane of Si of an X-ray diffraction (XRD) pattern of the silicon particles using Scherrer equation.

The silicate phase includes, for example, an oxide phase represented by a formula of $X_{2z}SiO_{2+z}$. In this formula, X represents an alkali metal, and z may satisfy a relationship of $0<x<1$. A lithium silicate (LSX) phase is represented by a formula of $Li_{2z}SiO_{2+z}$ ($0=z<1$). In view of stability, formation easiness, lithium ion conductivity, and the like, $z=\frac{1}{2}$ is more preferable.

For example, the composition of the LSX phase may be analyzed by the following method.

First, a mass of an LSX sample is measured. Subsequently, as described below, contents of carbon, lithium, and oxygen contained in the sample are calculated. Next, after the carbon content is subtracted from the mass of the sample, the content of lithium and oxygen occupied in the remaining amount is calculated, and from a molar ratio of lithium (Li) to oxygen (O), a ratio of $2z$ to $(2+z)$ can be obtained.

The carbon content is measured using a carbon/sulfur analyzer (such as EMIA-520, manufactured by HORIBA, Ltd.). After a sample is measured and placed on a magnetic board, and a combustion improver is added thereto, the sample is inserted in a firing furnace (carrier gas: oxygen) heated to 1,350° C., and a gas amount of carbon dioxide generated in the firing is detected by infrared absorption. A calibration curve is formed, for example, using carbon steel (carbon content: 0.49%) manufactured by Bureau of Analysed Sampe. Ltd, and the carbon content of the sample is calculated (high frequency induction furnace combustion-infrared absorption method).

The oxygen content is measured using an oxygen/nitrogen/hydrogen analyzer (such as EGMA-830, manufactured by HORIBA, Ltd.). A sample is placed in a Ni capsule and then charged together with Sn pellets and Ni pellets each functioning as flux into a carbon crucible heated by an electric power of 5.75 kW, and a carbon monoxide gas to be released is detected. A calibration curve is formed using a reference sample of $Y_2O_3$, and the oxygen content of the sample is calculated (inert gas fusion-nondispersive infrared absorption method).

The lithium content is measured such that after a sample is totally dissolved by a hot fluoronitric acid (hot mixed acid of a hydrofluoric acid and a nitric acid), and carbon which is a solution residue is removed by filtration, a filtrate obtained thereby is measured by an analysis using an inductively coupled plasma atomic emission spectroscopy (ICP-AES). A calibration curve is formed using a commercially available reference solution of lithium, and the lithium content of the sample is calculated.

An amount obtained by subtracting the carbon content, the oxygen content, and the lithium content from the sample mass of LSX is the total of the Si amount forming the silicon particles and the Si amount in the silicate phases. By a Si-NMR measurement, the content of the silicon particles is obtained, and the content of silicon present in LSX in the form of silicate is obtained.

The silicate composite particles can be recovered from a battery by the following method. First, after the battery is disassembled, and a negative electrode is recovered, the negative electrode is washed with anhydrous ethyl methyl carbonate or dimethyl carbonate, so that an electrolyte is removed. Next, a negative electrode mixture is peeled away from copper foil and is crushed using a mortar, so that a sample powder is obtained. Subsequently, the sample powder is dried in a dry atmosphere for one hour and is then dipped in a weakly-boiled 6M-hydrochloric acid for 10 minutes, so that alkali metals, such as Na and Li, contained in an adhesive and the like are removed. Next, after the sample powder is washed with ion-exchanged water and then filtrated drying is performed at 200° C. for one hour. Subsequently, firing is performed in an oxygen atmosphere at 900° C. to remove a carbon component, so that the silicate composite particles can only be isolated.

The silicate composite particles have an average particle diameter of 1 to 25 µm and preferably of 4 to 15 µm In the particle diameter range described above, a stress generated by the change in volume of the silicate composite particles in association with charge/discharge is likely to be reduced, and preferable cycle characteristics are likely to be obtained. The average particle diameter of the silicate composite particles indicates a particle diameter (volume average particle diameter) at a volume cumulative value of 50% in a particle size distribution measured by a laser diffraction scattering method. As a measurement device, for example, "LA-750" manufactured by HORIBA, Ltd. may be used.

In consideration of fluidity in a molten state, the silicate phases are preferably in an amorphous state in a sintering step. In an X-ray diffraction pattern of the silicate composite particles after the sintering step, a ratio of an integrated value of a diffraction peak of each of all the elements other than single silicon to an integrated value of a diffraction peak which belongs to the (111) plane of single Si is, for example, 0.5 or less, may be 0.3 or less, may also be 0.1 or less, and may further be 0 (zero). In addition, the diffraction peak which belongs to the (111) plane of single Si is observed at approximately $2\theta=28°$.

Since the silicate phase has a low electron conductivity, the electrical conductivity of the silicate composite particle also tends to be low. On the other hand, since the surface of the silicate composite particle is coated with an electrically conductive material so as to form an electrically conductive layer, the electrical conductivity of the silicate composite particle can be significantly increased. As the electrically conductive material, an electrically conductive carbon material is preferable.

The electrically conductive layer formed from an electrically conductive material is preferably thin so as not to substantially influence the average particle diameter of the silicate composite particles. In consideration of reliable electrical conductivity and diffusivity of lithium ions, the thickness of the electrically conductive layer is preferably 1 to 200 nm and more preferably 5 to 100 nm. The thickness of the electrically conductive layer may be measured by cross-sectional observation of the particles using a SEM or a TEM.

Next, a method for manufacturing the silicate composite particles will be described in detail.

<Preparation of Silicon Particles>

The silicon particles can be obtained by a chemical vapor deposition (CVD) method, a thermal plasma method, a physical crushing method, or the like. By the following methods, for example, silicon nanoparticles having an average particle diameter of 10 to 200 nm can be synthesized. The average particle diameter of the silicon particles indicates a particle diameter (volume average particle diameter) at a volume cumulative value of 50% in a volume particle size distribution measured by a laser diffraction scattering method.

(a) Chemical Vapor Deposition Method

The chemical vapor deposition method is a method to generate silicon particles, for example, by oxidizing or reducing a silane compound in a vapor phase. A reaction temperature may be set, for example, to 400° C. or more and 1,300° C. or less.

As the silane compound, for example, there may be used a hydrogenated silicon, such as silane or disilane, a halogenated silane, or an alkoxysilane. As the halogenated silane, for example, dichlorosilane, trichlorosilane, or tetrachlorosilane may be used. As the alkoxysilane, for example, tetramethoxysilane, tetraethoxysilane, or tetrabutoxysilane may be used.

For example, when a hydrogenated silicon is brought into contact with an oxidizing gas in a vapor phase, a composite of silicon particles and silicon oxide particles is obtained. That is, the vapor phase atmosphere may be an oxidizing gas atmosphere. When the composite is washed, for example, with a hydrofluoric acid, the silicon oxide is removed, and the silicon particles are obtained.

When a halogenated silane, an alkoxysilane, or the like is reduced, for example, fine particles of a molten metal formed by an atomizing method may be brought into contact with a silane compound. As the molten metal, for example, Na, K, Mg, Ca, Zn, or Al may be used. As an atomizing gas, for example, an inert gas, a halogenated silane, or a hydrogen gas may be used. That is, the vapor phase atmosphere may be an inert gas or a reducing gas atmosphere.

(b) Thermal Plasma Method

The thermal plasma method is a method in which a raw material of silicon is introduced into generated thermal plasma to produce silicon particles in plasma at a high temperature. The thermal plasma may be generated, for example, by an arc discharge, a high frequency discharge, a microwave discharge, or laser light radiation. Among those mentioned above, a discharge by a high frequency (RF) is an electrodeless discharge and is preferable since impurities are not likely to be mixed in silicon particles.

As the raw material, for example, a silicon oxide may be used. When the raw material is introduced into plasma, silicon and oxygen in the form of atoms or ions are instantly generated, and while cooling is performed, the silicon elements are bonded to each other, and silicon particles are generated by solidification.

(c) Physical Crushing Method

The physical crushing method (mechanical milling method) is a method in which coarse silicon particles are crushed by a crusher such as a ball mill or a bead mill. The inside of the crusher may be set, for example, to an inert gas atmosphere.

<Coating of Silicon Particles with Carbon Phase>

As a method to coat silicon particles with a carbon phase, for example, a chemical vapor deposition method (CVD method), a sputtering method, an ALD (atomic layer deposition) method, a wet mixing method, or a dry mixing method may be mentioned. Among those methods, a chemical vapor deposition method or a wet mixing method is preferable.

(a) Chemical Vapor Deposition Method

In the chemical vapor deposition method, by heating silicon particles introduced into a hydrocarbon-based gas atmosphere, a carbon phase may be formed by depositing a carbon material generated by pyrolysis of the hydrocarbon-based gas on particle surfaces. A temperature of the hydrocarbon-based gas atmosphere may be set, for example, to 500° C. to 1,000° C. As the hydrocarbon-based gas, for example, a chain hydrocarbon gas, such as acetylene or methane, or an aromatic hydrocarbon, such as benzene, toluene, or xylene, may be used.

(b) Wet Mixing Method

In the wet mixing method, for example, after a carbon precursor, such as a coal pitch, a petroleum pitch, or a tar, is dissolved in a solvent, a solution thus obtained and silicon particles may be mixed together and then dried. Subsequently, the silicon particles coated with the carbon precursor may be heated in an inert gas atmosphere, for example, at 600° C. to 1,000° C. to carbonize the carbon precursor so as to form a carbon phase.

The carbon phase is formed, for example, from an amorphous carbon having a low crystallinity. The amorphous carbon has a low hardness and also has a significant buffer effect to silicon particles, the volumes of which are changed by charge/discharge. The amorphous carbon may be either a graphitizable carbon (soft carbon) or a non-graphitizable carbon (hard carbon).

<Synthesis of Silicate Composite Particle>

Process (i)

As a raw material of the silicate, a raw material mixture containing a Si raw material and a raw material, such as an alkali metal, at a predetermined ratio may foe used. When LSX is synthesized, as the raw material mixture, a Si raw material and a Li raw material are used. The raw material mixture is melted and then allowed to pass through metal rollers to form flakes, so that the silicate is obtained. The silicate may also be synthesized by a solid phase reaction such that the raw material mixture is fired at a temperature of a melting point or less without melting the raw material mixture.

As the Si raw material, a silicon oxide (such as $SiO_2$) may be used. As a raw material of an alkali metal, an alkaline earth metal, or an element M, for example, a carbonate, an oxide, a hydroxide, a hydride, a nitrate, or a sulfate of an alkali metal, an alkaline earth metal, or an element M may be used, respectively. Among those mentioned above, for example, a carbonate, an oxide, or a hydroxide is preferable.

Process (ii)

Next, silicon particles (hereinafter, referred to as "carbon-coated silicon particles" in some cases) having surfaces at least partially coated with a carbon phase are blended and mixed with the silicate. For example, through the following steps (a) to (c), the silicate composite particles are formed.

Step (a)

First, the carbon-coated silicon particles and a silicate powder are mixed with each other, for example, at a mixing ratio of 20:80 to 95:5. Next, by using a device such as a ball mill, the mixture of the carbon-coated silicon particles and the silicate is stirred. In this case by adding an organic solvent to the mixture, a wet mixing is preferably performed. A predetermined amount of the organic solvent may be charged once to a crushing container at an initial crushing stage or may be intermittently charged a plurality of times to the crushing container in a crushing process. The organic solvent functions to prevent adhesion of a crushing object to an inner wail of the crushing container.

As the organic solvent, for example, there may be used an alcohol, an ether, a fatty acid, an alkane, a cycloalkane a silicate ester, or a metal alkoxide.

Step (b)

Next, the mixture is pressurized and heated at 450° C. to 1,000° C., for example, in an inert gas atmosphere (atmosphere of argon, nitrogen, or the like), so that the mixture is sintered. For the sintering, a sintering apparatus, such as a hot press or a discharge plasma sintering, which is able to apply a pressure in an inert atmosphere may be used. In the sintering, the silicate is melted and allowed to flow so as to fill voids formed between the silicon particles. As a result, a dense block-shaped sintered body in which the silicate phases and the silicon particles function as sea portions and island portions, respectively, can be obtained.

By crushing the sintered body thus obtained, the silicate composite particles are obtained. By appropriate selection of crushing conditions, silicate composite particles having a predetermined average particle diameter can be obtained.

Process (iii)

Next, at least parts of the surfaces of the silicate composite particles may be coated with an electrically conductive material so as to form electrically conductive layers. The electrically conductive material is preferably electrochemically stable and is also preferably an electrically conductive carbon material. As a method to coat the surfaces of the silicate composite particles with an electrically conductive carbon material, for example, there may be mentioned a chemical vapor deposition method which uses as a raw material, a chain hydrocarbon gas, such as acetylene or methane, or a method in which after the silicate composite particles are mixed, for example, with a coal pitch, a petroleum pitch, or a phenol resin, a mixture thus formed is carbonized by heating. A carbon black may be adhered to the surfaces of the silicate composite particles.

Process (iv)

A step of washing the silicate composite particles (including the case in which the electrically conductive layers are provided on the surfaces thereof) may be performed with an acid. For example, by washing the composite particles with an acidic aqueous solution, a small amount of alkali components present on the surfaces of the silicate composite particles can be dissolved and removed. As the acidic aqueous solution, an aqueous solution of an inorganic acid, such as a hydrochloric acid, a hydrofluoric acid, a sulfuric acid, a nitric acid, a phosphoric acid, or a carbonic acid, or an aqueous solution of an organic acid, such as succinic acid or acetic acid, may be used.

FIG. 1 schematically shows a cross-section of one example of a silicate composite particle 20. The silicate composite particle 20 includes, in general, a mother particle 23 which is a secondary particle formed of aggregated primary particles 24. The primary particles 24 each include a silicate phase 21 and silicon particles 22 dispersed in the silicate phase 21. The mother particle 23 has a sea-island structure which includes the silicate phases 21 and the silicon particles 22 dispersed in the matrix of the silicate phases 21. The silicon particles 22 are approximately uniformly dispersed in the silicate phase 21.

In a cross-section of the silicate composite particle, a carbon phase 25 is present. The carbon phase 25 includes first regions 25a which cover at least parts of surfaces of the silicon particles and second regions 25b present along at least parts of interfaces between primary particles 24 adjacent to each other.

Figure 2:
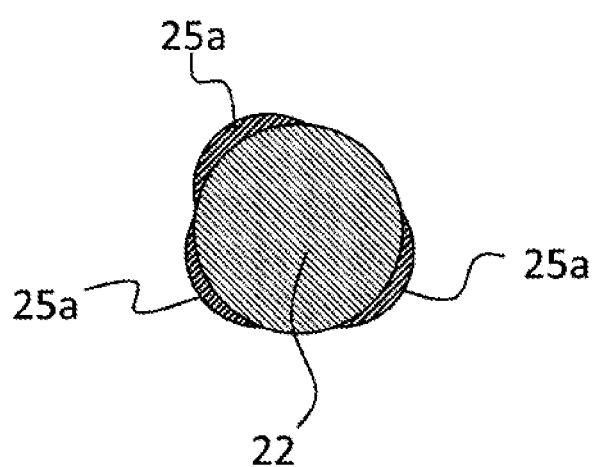
FIG. 2 is a conceptual view showing an enlarged cross-section of a silicon particle having a surface partially coated with a carbon material.

FIG. 2 is a conceptual view showing an enlarged cross-section of the silicon particle 22 having a surface partially covered with the first regions 25a. When a mixture of the carbon-coated silicon particles and a silicate powder is sintered, the first region 25a suppresses a reaction between the silicate and the silicon.

The second region 25b is formed primarily from a residue of an organic solvent which is used when the carbon-coated silicon particles and the silicate powder are wet mixed in a process for manufacturing the silicate composite particles.

The silicate composite particle 20 further includes an electrically conductive material (electrically conductive layer 26) which coats at least a part of the surface of the mother particle 23. In this case, an end portion of the second region 25b at a surface side of the mother particle 23 is preferably in contact with the electrically conductive layer 26. Accordingly, a preferable electrically conductive network is formed from the surface of the mother particle 23 to the inside thereof.

The silicate phase 21 and the silicon particle 22 are each formed from fine particles which are gathered together. The silicate phase 21 may be formed from particles finer than those for the silicon particle 22. In this case, in a X-ray diffraction (XRD) pattern of the silicate composite particle 20, a ratio of an integrated value of each of ail the other diffraction peaks to an integrated value of a diffraction peak which belongs to the (111) plane of single Si is, for example, 0.5 or less.

The mother particle 23 may also contain at least another component other than the silicate phases 21, the silicon particles 22, and the carbon phase 25. For example, the silicate composite particle 20 may also contain a small amount of a crystalline or amorphous $SiO_2$ or the like However, a content of the $SiO_2$ in the mother particle 23 measured by a Si-NMR is, for example, preferably less than 7 percent by mass. In addition, in order to improve the strength of the mother particle 23, a reinforcing material, such as an oxide including $ZrO_2$ or a carbide, may also be contained in the mother particle 23 in an amount of less than 10 percent by weight.

An average particle diameter of the primary particles 24 is, for example, 0.2 to 10 μm and preferably 2 to 8 μm. Accordingly, a stress generated by the change in volume of the silicate composite particle in association with charge/discharge can be more likely to be reduced, and hence, preferable cycle characteristics are likely to be obtained. In addition, since an appropriate surface area of the silicate composite particle can be obtained, a decrease in capacity caused by a side reaction with an electrolyte can also be suppressed.

The average particle diameter of the primary particles 24 can be measured by observation of the cross-section of the silicate composite particle using a SEM. In particular, the average particle diameter of the primary particles 24 can be obtained by averaging diameters of equivalent circles (each having the same area as the cross-sectional area of a corresponding primary particle) which have areas equivalent to the cross-sectional areas of arbitrarily selected 100 primary particles 24.

An average particle diameter of the silicon particles 22 is, before an initial charge, 500 nm or less, preferably 200 nm or less, and more preferably 50 nm or less. Since the silicon particles 22 are appropriately formed to have the average particle diameter as described above, the change in volume in charge/discharge is decreased, and a structural stability is improved. The average particle diameter of the silicon particles 22 is measured by observation of the cross-section of the silicate composite particle using a SEM or a TEM. In particular, the average particle diameter of the silicon particles 22 can be obtained by averaging the maximum diameters of arbitrarily selected 100 silicon particles 22.

Hereinafter, a negative electrode, a positive electrode. an electrolyte, and a separator of a secondary battery according to an embodiment of the present disclosure will be described.

[Negative Electrode]

A negative electrode includes, for example, a negative electrode collector and a negative electrode active material layer. The negative electrode active material layer contains a negative electrode active material. The negative electrode active material contains silicate composite particles which include silicon particles having surfaces at least partially coated with a carbon phase. The negative electrode active material layer is formed on at least one surface of the negative electrode collector. The negative electrode active material layer may be formed on one surface of the negative electrode collector or on each of two facing surfaces thereof. The negative electrode active material layer may be formed such that after a negative slurry in which a negative electrode mixture is dispersed in a dispersing medium is applied to the surface of the negative electrode collector, drying is performed. A coating film obtained after the drying may be rolled, if needed. The negative electrode active material layer may further contain as an arbitrary component, a binding agent, an electrically conductive agent, a thickening agent, and/or the like.

The negative electrode active material may further contain another active material. As the another active material, for example, a carbon-based active material which electrochemically occludes and releases lithium ions is preferably contained. Since the volume of the silicate composite particle is expanded and contracted in association with charge/discharge, when the ratio thereof occupied in the negative electrode active material is increased, contact failure between the negative electrode active material and the negative electrode collector is liable to occur in association with charge/discharge. On the other hand, since the silicate composite particles and the carbon-based active material are used in combination, while a high capacity of the silicon particles is imparted to the negative electrode, excellent cycle characteristics can be achieved. A rate of the silicate composite particles occupied in the total of the silicate composite particles and the carbon-based active material is, for example, 1 to 30 percent by mass and preferably 3 to 15 percent by mass. Accordingly, an increase in capacity and an improvement in cycle characteristics are both likely to be achieved.

As the carbon-based active material, for example, a graphite, a graphitizable carbon (soft carbon), or a non-graphitizable carbon (hard carbon) may be mentioned. Among those mentioned above, since being excellent in charge/discharge stability and having a small irreversible capacity, the graphite is preferable. The graphite indicates a material having a graphite crystalline structure and for example, includes a natural graphite, an artificial graphite, and graphitized mesocarbon particles. The carbon-based active material may be used alone, or at least two types thereof may be used in combination.

A content of the carbon-based active material in the negative electrode active material (that is, a rate of the carbon-based active material occupied in the total of the silicate composite particles and the carbon-based active material) is 70 percent by mass or more and 99 percent by mass or less and preferably 85 percent by mass or more and 97 percent by mass or less. Accordingly, the increase in capacity and the improvement in cycle characteristics are both likely to be achieved.

As the negative electrode collector, for example, metal foil, a mesh body, a net body, or a punched sheet may be used. As a material of the negative electrode collector, for example, stainless steel, nickel, a nickel alloy, copper, or a copper alloy may be mentioned. The thickness of the negative electrode collector is, for example, 1 to 50 μm.

As the binding agent, for example, there may be mentioned a fluorine resin, a polyolefin resin, a polyamide resin, a polyimide resin, a vinyl resin, a styrene-butadiene copolymer rubber (SBR), a poly(acrylic acid), or a derivative thereof. Those resins may be used alone, or at least two types thereof may be used in combination. As the electrically conductive agent, for example, a carbon black, electrically conductive fibers, a fluorinated carbon, or an organic electrically conductive material may be mentioned. Those may be used alone, or at least two types thereof may be used in combination. As the thickening agent, for example, a carboxymethyl cellulose (CMC) or a poly(vinyl alcohol) may be mentioned. Those may be used alone, or at least two types thereof may be used in combination.

As the dispersing medium, for example, water, an alcohol, an ether, N-methyl-2-pyrrolidone (NMP), or a mixed solvent therebetween may be mentioned.

[Positive Electrode]

The positive electrode includes, for example, a positive electrode collector and a positive electrode active material layer formed on at least one surface of the positive electrode collector. The positive electrode active material layer may be formed such that after a positive electrode slurry in which a positive electrode mixture dispersed in a dispersing medium is applied to the surface of the positive electrode collector, drying is performed. A coating film obtained after the drying may be rolled, if needed. The positive electrode active material layer may be formed on one surface of the positive electrode collector or on each of two facing surfaces thereof.

The positive electrode mixture may contain, as an essential component, a positive electrode active material and, as an arbitrary component, a binding agent, an electrically conductive agent, and/or the like.

As the positive electrode active material, a lithium composite metal oxide may be used. As the lithium composite metal oxide, for example, there may be mentioned $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMePO_4$, or $Li_2MePO_4F$. In addition, M is at least one selected from the group consisting of Na, Mg, Sc, Y, Mn, Fe, Co, Ni, Cu, Zn, Al, Cr, Pb, Sb, and B. Me at least contains a transition metal (for example, contains at least one selected from the group consisting of Mn, Fe, Co, and Ni). In the above composition, $0 \leq a \leq 1.2$, $0 \leq b \leq 0.9$, and $2.0 \leq c \leq 2.3$ are satisfied. In addition, the a value which indicates a molar ratio of lithium is a value in a discharged state and is increased/decreased by charge/discharge.

As the binding agent and the electrically conductive agent, agents similar to those described above for the negative electrode may also be used. As the electrically conductive agent, a graphite, such as a natural graphite or an artificial graphite, may also be used.

The shape and the thickness of the positive electrode collector may be selected from the shape and the range similar to those of the negative electrode collector. As a material of the positive electrode collector, for example, stainless steel, aluminum, an aluminum alloy, or titanium may be mentioned.

[Electroylte]

The electrolyte contains a solvent and a lithium salt dissolved in the solvent. A concentration of the lithium salt in the electrolyte is, for example, 0.5 to 2 mol/L. The electrolyte may also contain at least one known additive.

As the solvent, an aqueous solvent or a nonaqueous solvent may be used. As the nonaqueous solvent, for example a cyclic carbonate ester, a chain carbonate ester, or a cyclic carboxylic acid ester may be used. As the cyclic carbonate ester, for example, propylene carbonate (PC) or ethylene carbonate (EC) may be mentioned. As the chain carbonate ester, for example, diethyl carbonate (DEC), ethyl methyl carbonate (EMC), or dimethyl carbonate (DMC) may be mentioned. As the cyclic carboxylic acid ester, for example γ-butyrolactone (GBL) or γ-valerolactone (GVL) may be mentioned. The nonaqueous solvent may be used alone, or at least two types thereof may be used in combination.

As the lithium salt, for example, there may be used a lithium salt of a chlorine-containing acid (such as $LiClO_4$, $LiAlCl_4$, or $LiB_{10}Cl_{10}$); a lithium salt of a fluorine-containing acid (such as $LiPF_6$, $LiBF_4$, $LiSbF_6$, $LiAsF_6$, $LiCF_3SO_3$, or $LiCF_3CO_2$); a lithium salt of a fluorine-containing acid imide (such as $LiN(SO_2F)_2$, $LiN(CF_3SO_2)_2$, $LiN(CF_3SO_2)(C_4F_3SO_2)$, or $LiN(C_2F_5SO_2)_2$) ; or a lithium halide (such as LiCl, LiBr, or LiI). The lithium salt may be used alone, or at least two types thereof may be used in combination.

[Separator]

In general, between the positive electrode and the negative electrode, at least one separator is provided. The separator has a high ion permeability and appropriate mechanical strength and insulating property. As the separator, for example, a fine porous thin film, a woven cloth, or a non-woven cloth may be used. As a material of the separator, for example, a polyolefin, such as a polypropylene or a polyethylene, may be used.

As one example of the structure of the secondary battery, a structure in which an electrode group formed by winding a positive electrode, a negative electrode, and at least one separator and an electrolyte are received in an exterior package may be mentioned. Instead of the winding type electrode group, a laminate electrode group in which at least one positive electrode and at least one negative electrode are laminated with at least one separator interposed therebetween may also be used. In addition, an electrode group having another configuration may also foe used. The secondary battery may have any shape, such as a cylindrical, a square, a coin, a button, or a laminate shape.

Figure 3:
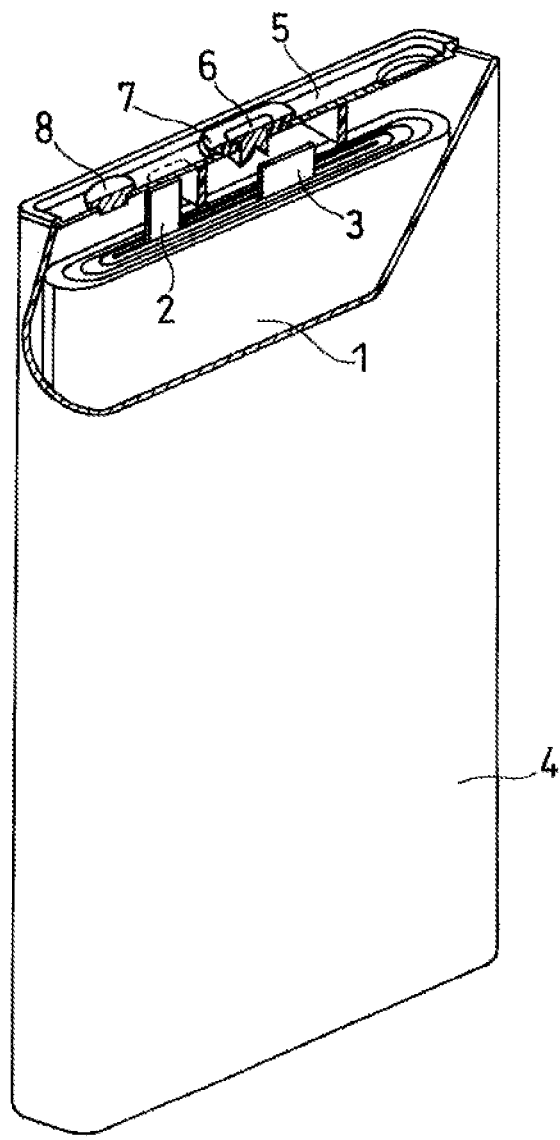
FIG. 3 is a partially notched perspective view of a secondary battery according to an embodiment of the present disclosure.

FIG. 3 is a partially notched schematic perspective view of a square secondary battery according to one embodiment of the present disclosure. The battery includes a bottom-closed square battery case 4; an electrode group 1 and an electrolyte (not shown) which are received in the battery case 4; and a sealing plate 5 which seals an opening portion of the battery case 4. The electrode group 1 includes a long belt-shaped negative electrode, a long belt-shaped positive electrode, and at least one separator interposed therebetween. The negative electrode, the positive electrode, and the separator are wound around a flat plate-shaped winding core, and by pulling out the winding core, the electrode group 1 is formed. The sealing plate 5 has a liquid charge port sealed by a sealing plug 3 and a negative electrode terminal 6 insulated from the sealing plate 5 by a gasket 7.

One end of a negative electrode lead 3 is fitted to a negative electrode collector of the negative electrode by welding or the like. One end of a positive electrode lead 2 is fitted to a positive electrode collector of the positive electrode by welding or the like. The other end of the negative electrode lead 3 is electrically connected to the negative electrode terminal 6. The other end of the positive electrode lead 2 is electrically connected to the sealing plate 5. At an upper portion of the electrode group 1, a resin-made frame body which isolates the electrode group 1 from the sealing plate 5 and which also isolates the negative electrode lead 3 from the battery case 4 is provided.

Hereinafter, although the present invention will be described in detail with reference to Examples and Comparative Examples, the present invention is not limited to the following Examples.

EXAMPLE 1

[Preparation of Silicon Nanoparticles]

After coarse silicon particles (3N, average particle diameter: 10 μm) were filled in a pot (made of SUS, volume: 500 mL) of a planetary ball mill (P-5, manufactured by Fritsch), and 24 SUS-made balls (diameter: 20 mm) were also charged in the pot, a lid of the pot is closed, and crushing was performed at 200 rpm in an inert atmosphere to have an average particle diameter of 150 nm, so that silicon nanoparticles were prepared.

[Coating of Silicon Particles with Carbon Phase]

A carbon material was deposited on surfaces of the silicon nanoparticles by a chemical vapor deposition method. In particular, the silicon nanoparticles were charged in an acetylene gas atmosphere, and an acetylene gas was pyrolyzed by heating at 700° C. and deposited on the surfaces of the silicon nanoparticles, so that a carbon phase was formed. An amount of the carbon material with respect to 100 parts by mass of the silicon nanoparticles was set to 10 parts by mass.

[Preparation of Silicate Composite Particles]

After silicon dioxide and lithium carbonate were mixed to have an atomic ratio Si/Li of 1.05, a mixture thus prepared was fired in air at 950° C. for 10 hours, so that a lithium silicate represented by a formula of $Li_2Si_2O_5$ (z=0.5) was obtained. The lithium silicate thus obtained was crushed to have an average particle diameter of 10 μm.

The lithium silicate ($Li_2SiO_5$) having an average particle diameter of 10 μm and the carbon-coated silicon were mixed at a mass ratio of 70:30. After the mixture was filled in a pot (made of SUS, volume: 500 mL) of a planetary ball mill (P-5, manufactured by Fritsch), and 24 SUS-made balls (diameter: 20 mm) were charged in the pot, a lid of the pot is closed, and the mixture was stirred in an inert atmosphere at 200 rpm for 50 hours.

Next, a powdered mixture was recovered in an inert atmosphere and was then fired in an inert atmosphere at 800° C. for four hours while a pressure is applied thereto by a hot press machine, so that a sintered mixture (LSX) was obtained.

Subsequently, after LSX was crushed and was then allowed to pass through a 40-μm mesh, LSX particles thus obtained were mixed with a coal pitch (MCP250, manufactured by JFE Chemical Corporation) and fired in an inert atmosphere at 800° C., so that electrically conductive layers were formed by coating surfaces of the LSX particles with an electrically conductive carbon. A coating amount of the electrically conductive layer was set to 5 percent by mass with respect to the total mass of the LSX particle and the electrically conductive layer. Next, by using a sieve, LSX particles having an average particle diameter of 5 μm and coated with the electrically conductive layers were obtained.

A crystallite size of the silicon particle calculated from a diffraction peak which belonged to the Si (111) plane by an XRD analysis of the LSX particles was 15 nm.

When the composition of the lithium silicate phase was analyzed by the above method (the high frequency induction furnace combustion-infrared absorption method, the inert gas fusion-nondispersive infrared absorption method, or the inductively coupled plasma atomic emission spectroscopy (ICP-AES)), the Si/Li ratio was 1.0, and a content of $Li_2Si_2O_5$ measured by a Si-NMR was 70 percent by mass (content of the silicon particles: 30 percent by mass).

INDUSTRIAL APPLICABILITY

According to the present disclosure, a secondary battery having a high capacity and preferable cycle characteristics can be provided. The secondary battery according to the present disclosure is useful as a main power source for a mobile communication device, a mobile electronic device, or the like.

Although a preferable embodiment of the present invention at the moment has been described, the disclosure should not be restrictively interpreted. Various changes and/or modifications may be surely apparent to a person skilled in the art of the present invention by reading the disclosure described above. Hence, the accompanying claims are to be interpreted to include all the changes and modifications without departing from the spirit and the scope of the present invention.

REFERENCE SIGNS LIST

1: electrode group, 2: positive electrode lead, 3: negative electrode lead, 4: battery case, 5: sealing plate, 6: negative electrode terminal, 7: gasket, 8: sealing plug, 20: LSX particle, 21: lithium silicate phase, 22: silicon particle, 23: mother particle, 24: primary particle, 25: carbon phase, 25a: first region, 25b: second region, 26: electrically conductive layer

The invention claimed is:

1. A A negative electrode active material for a secondary battery, comprising a silicate composite particle,
    wherein the silicate composite particle contains: silicate phases; silicon particles dispersed in each of the silicate phases; and a carbon phase,
    the silicate phases contain at least one selected from the group consisting of an alkali metal and an alkaline earth metal, and
    at least parts of the carbon phase coat at least parts of surfaces of the silicon particles,
    wherein the silicate composite particle includes a primary particle including: one silicate phase of the silicate phases; the silicon particles dispersed in the one silicate phase; and a portion of the carbon phase,
    wherein the portion of the carbon phase is located inward from a perimeter of the primary particle so as to coat surfaces of the silicon particles enclosed by the one silicate phase.

2. The negative electrode active material for a secondary battery, according to claim 1, wherein an area rate of the carbon phase occupied in a cross-section of the silicate composite particle is 0.5% to 10%.

3. The negative electrode active material for a secondary battery, according to claim 1,
wherein in a cross-section of the silicate composite particle, a rate of the at least parts of the surfaces of the silicon particles coated with the carbon phase is 30% to 100%.

4. The negative electrode active material for a secondary battery, according to claim 1,
wherein the silicate phases further contain an element M, and
the element M is at least one selected from the group consisting of Be, Mg, Al, B, Zr, Nb, Ta, La, V, Y, Ti, P, Bi, Zn, Sn, Pb, Sb, Co, Er, F and W.

5. The negative electrode active material for a secondary battery, according to claim 1, wherein the silicate phases each include an oxide phase represented by a formula of $X_{2z}SiO_{2+z}$,
the X represents an alkali metal, and
in the above formula, $0<z<1$ is satisfied.

6. A secondary battery comprising: a positive electrode; a negative electrode; an electrolyte; and a separator interposed between the positive electrode and the negative electrode,
wherein the negative electrode includes a collector and a negative electrode active material layer, and
the negative electrode active material layer contains the negative electrode active material for a secondary battery according to claim 1.

7. The negative electrode active material for a secondary battery, according to claim 1,
wherein at least a part of an outer surface of the silicate composite particle is coated with an electrically conductive carbon material so as to form an electrically conductive layer, distinct from the at least parts of the carbon phase.

* * * * *